(12) United States Patent
Kim et al.

(10) Patent No.: US 11,702,002 B2
(45) Date of Patent: Jul. 18, 2023

(54) DANGEROUS SITUATION NOTIFICATION ASSEMBLY FOR WINDOW SHADE DEVICE OF VEHICLE AND DANGEROUS SITUATION NOTIFICATION ASSEMBLY FOR REAR WINDOW OF VEHICLE

(71) Applicant: KOREA FUEL-TECH CORPORATION, Anseong (KR)

(72) Inventors: Jae San Kim, Yongin (KR); Bong Jung Kim, Anseong (KR); Jeong Soon Park, Pyeongtaek (KR)

(73) Assignee: KOREA FUEL-TECH CORPORATION, Anseong (KR)

( * ) Notice: Subject to any disclaimer, the term of this patent is extended or adjusted under 35 U.S.C. 154(b) by 283 days.

(21) Appl. No.: 17/272,138

(22) PCT Filed: Sep. 10, 2018

(86) PCT No.: PCT/KR2018/010552
§ 371 (c)(1),
(2) Date: Feb. 26, 2021

(87) PCT Pub. No.: WO2020/050441
PCT Pub. Date: Mar. 12, 2020

(65) Prior Publication Data
US 2021/0339676 A1    Nov. 4, 2021

(30) Foreign Application Priority Data
Sep. 3, 2018 (KR) .......... 10-2018-0104606

(51) Int. Cl.
*B60Q 1/52* (2006.01)
*B60J 1/20* (2006.01)
(Continued)

(52) U.S. Cl.
CPC .............. *B60Q 1/52* (2013.01); *B60J 1/208* (2013.01); *B60Q 1/0017* (2013.01); *B60Q 1/302* (2013.01); *B60Q 5/00* (2013.01)

(58) Field of Classification Search
None
See application file for complete search history.

(56) References Cited

U.S. PATENT DOCUMENTS 6,969,185 B1 * 11/2005 Adair .................. G09F 7/00
362/486
10,940,794 B2 * 3/2021 Kiefaber ............... B60Q 1/444
(Continued)

FOREIGN PATENT DOCUMENTS

DE    1 630 826 A1    7/1971
DE    296 21 158 U1    5/1998
(Continued)

OTHER PUBLICATIONS

The Extended European Search Report for European Patent Application No. 18932553.3, dated May 10, 2022.

*Primary Examiner* — Fekadeselassie Girma

(57) ABSTRACT

The present disclosure relates to a dangerous situation notification assembly for a window shade device of a vehicle and a dangerous situation notification assembly for a rear window of a vehicle. A dangerous situation notification assembly for a window shade device for vehicles, according to the present disclosure, which has a shade provided on any one of upper and lower sides of a rear window and reciprocates between a shading position where the rear window is shaded and a rolling position where the shade is rolled from the shading position, comprises: a dangerous situation notification unit which is arranged in the shade and selectively emits light at the shading position of the shade to output a dangerous situation; and a light source unit which is adjacent to the shade and supplies light to the dangerous (Continued)

situation notification unit so that the dangerous situation notification unit selectively emits light.

9 Claims, 12 Drawing Sheets

(51) Int. Cl.
    *B60Q 1/00*    (2006.01)
    *B60Q 1/30*    (2006.01)
    *B60Q 5/00*    (2006.01)

(56) References Cited

U.S. PATENT DOCUMENTS

2006/0106159 A1* 5/2006 Ogawa ............... C08G 18/6216
    524/589
2019/0135170 A1* 5/2019 Salter ..................... B60Q 3/20
2021/0339676 A1* 11/2021 Kim ........................ B60J 1/208
2023/0032224 A1* 2/2023 Meijers ..................... B60J 1/20

FOREIGN PATENT DOCUMENTS

| | | |
|---|---|---|
| DE | 200 01 311 U1 | 5/2000 |
| DE | 100 65 007 A1 | 2/2002 |
| DE | 10 2012 013 602 A1 | 4/2014 |
| DE | 10 2013 011605 A1 | 1/2015 |
| KR | 0157806 B1 * | 10/1998 |
| KR | 0157806 B1 | 10/1998 |
| KR | 1999-0014774 U | 5/1999 |
| KR | 20-0281523 Y1 | 7/2002 |
| KR | 10-0845059 B1 | 7/2008 |
| KR | 10-1772444 B1 | 8/2017 |
| KR | 101772444 B1 * | 8/2017 |
| WO | WO-2009013744 A2 * | 1/2009 ......... G02B 27/2214 |

* cited by examiner

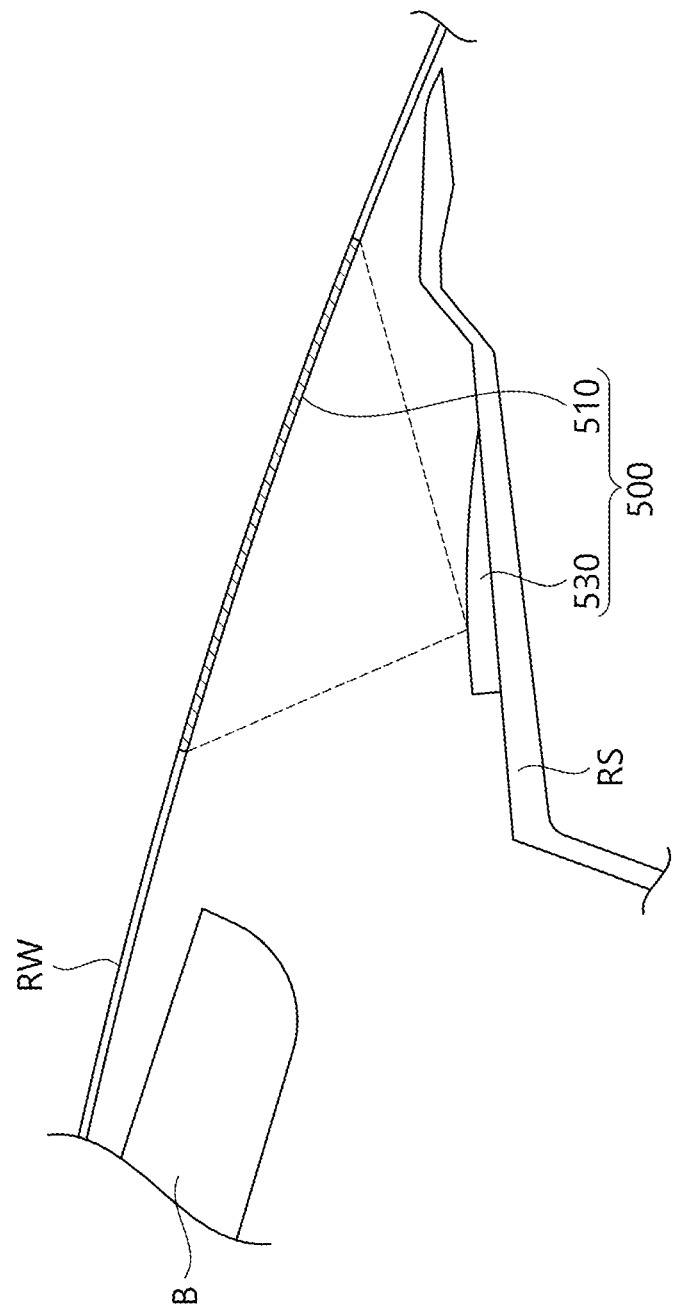

DANGEROUS SITUATION NOTIFICATION ASSEMBLY FOR WINDOW SHADE DEVICE OF VEHICLE AND DANGEROUS SITUATION NOTIFICATION ASSEMBLY FOR REAR WINDOW OF VEHICLE

CROSS-REFERENCE TO RELATED APPLICATION

This application is a national stage application, filed under 35 U.S.C. § 371 of International Patent Application No. PCT/KR2018/010552, filed on Sep. 10, 2018, which claims the priority of Korean application No. 10-2018-0104606 filed Sep. 3, 2018, the contents of which are incorporated by reference.

TECHNICAL FIELD

The present disclosure relates to a dangerous situation notification assembly for a window shade device of a vehicle and a dangerous situation notification assembly for a rear window of the vehicle, and more particularly, to a dangerous situation notification assembly for a window shade device of a vehicle, which outputs a dangerous situation at emergency or dangerous situations on a shield device or rear window for shielding the rear of the vehicle, and a dangerous situation notification assembly for the rear window of the vehicle.

BACKGROUND ART

When it is difficult for a vehicle to operate due to a problem such as a breakdown or an accident while the vehicle is traveling on the road, the driver should move the vehicle to an area outside the travel path of the vehicle such as the outer side of the road or the shoulder of a highway. In this case, the driver should display an emergency situation in order to notify of the dangerous situation for the driver of another vehicle traveling forward from the rear of the vehicle in which the problem has occurred.

For example, an emergency indication should be placed using a product such as a tripod at the rear of the vehicle in which the breakdown or accident has occurred. Here, laws or regulations for an emergency situation indicating device, such as a tripod, are different from country to country, and in the case of the Republic of Korea, there is a rule that the emergency situation indicating device must be placed at a point 100 m behind a vehicle in which a breakdown or accident has occurred.

Meanwhile, as for the emergency situation indicating device, in addition to the above-described tripod, "Vehicle accident display means" of Korean Patent No. 10-1537103 has been published. The "Vehicle accident display means" of Korean Patent No. 10-1537103 described above includes a compressed air container, a balloon, a case, and a fixing part. The existing "Vehicle accident display means" has a technical feature of injecting compressed air into the balloon to raise the balloon upward from a trunk area of the vehicle to notify of an emergency situation for a driver of a vehicle traveling forward from behind.

However, first) there are problems that the use of an emergency situation indicating device such as the existing tripod is installed at a position lower than the eye level (the floor of the road, etc.) of the driver of the vehicle traveling forward from behind, thereby reducing visibility, and that it is difficult to visually recognize the emergency situation indicating device at night because there is no configuration such as a lighting or light emission.

Second) since the related literature "Vehicle Accident Display means" of Korean Patent No. 10-1537103 includes additional equipment which is the balloon and the compressed air container for supplying compressed air to the balloon to notify of an emergency situation, there are problems that the vehicle increases in weight and also that the balloon is damaged by an environmental factor.

DISCLOSURE

Technical Problem

An object of the present disclosure is to provide a dangerous situation notification assembly for a window shade device of a vehicle and a dangerous situation notification assembly for a rear window of the vehicle, the assemblies which have improved structure, so that visibility for a driver of a vehicle traveling forward from behind is improved when a vehicle breakdown or an accident occurs.

In addition, another object of the present disclosure is to provide a dangerous situation assembly for a window shade device of a vehicle and a dangerous situation notification assembly for a rear window of the vehicle, the assemblies which have improved structures, so that visibility for a driver of a vehicle traveling forward from behind is improved by using light when a vehicle breakdown or an accident occurs at night.

Technical Solution

According to the present disclosure, there is provided a dangerous situation notification assembly for a window shade device for a vehicle, and the window shade device has a shade provided on any one of upper and lower sides of a rear window and reciprocating between a shading position where the rear window is shaded and a rolling position where the shade is rolled from the shading position, and the assembly includes: a dangerous situation notification unit disposed at the shade and configured to selectively emit light at the shading position of the shade to output a dangerous situation; and a light source unit disposed adjacent to the shade and configured to provide light to the dangerous situation notification unit so that the dangerous situation notification unit selectively emits light.

Here, the dangerous situation notification unit may be formed of optical fibers in the shade.

In addition, the dangerous situation notification assembly for the window shade device of the vehicle may further include an optical line which is disposed between the dangerous situation notification unit and the light source unit, and which is configured to optically connect the dangerous situation notification unit and the light source unit so that light provided from the light source unit is transmitted to the dangerous situation notification unit.

The optical fibers forming the dangerous situation notification unit may be formed by any one processing of weaving, coating, impregnation, and lamination on the shade.

Meanwhile, the dangerous situation notification unit may be formed by processing any one of fluorescence and glaring according to any one of painting, dyeing, and coloring on the shade.

The dangerous situation notification unit may be output by reflected light on the shade by light irradiated by the light source unit.

The dangerous situation notification unit may be output as at least one of a figure and a character at the shading position of the shade.

The dangerous situation notification unit may be output to flicker at a predetermined interval of light irradiated from the light source unit.

In addition, the dangerous situation notification assembly for the window shade device of the vehicle may further include a warning sound notification unit disposed at the vehicle body corresponding to at least one of the upper and lower sides of the rear window and configured to output a dangerous situation of the vehicle by a warning sound.

Next, according to the present disclosure, there is also provided a dangerous situation notification assembly for a rear window of a vehicle, and the assembly is disposed at a vehicle body surrounding the rear window and the assembly includes: a dangerous situation notification unit configured to be output on a surface of the rear window; and a dangerous situation output unit disposed at the vehicle body corresponding to any one of upper and lower sides of the rear window, and configured to form the dangerous situation notification unit by irradiating light on the rear window.

Here, the dangerous situation output unit may be configured to project a shape of the dangerous situation notification unit on the surface of the rear window.

The dangerous situation notification unit may be output as at least one of a figure and a character on the surface of the rear window.

The dangerous situation output unit may be configured to output the dangerous situation notification unit on the surface of the rear window at a predetermined interval so that dangerous situation notification unit is output to flicker on the surface of the rear window.

In addition, the dangerous situation notification assembly for the rear window of the vehicle may further include a warning sound notification unit disposed at the window shade device of the vehicle and configured to output a dangerous situation of the vehicle by a warning sound.

Details of other embodiments are included in the detailed description and drawings.

Advantageous Effects

A dangerous situation notification assembly for a window shade device of a vehicle and a dangerous situation notification assembly for a rear window of the vehicle according to the present disclosure are as follows.

First, since it is possible to selectively output a dangerous situation notification unit on the shade at the shading position of the shade by using light, it is possible to prevent a secondary accident by warning of a dangerous situation for a driver or occupant of a vehicle approaching from behind.

Second, since the dangerous situation notification unit to be selectively output on the shade can flicker at a predetermined interval and a warning sound can be output, it is possible to prevent a secondary accident by warning of a dangerous situation for a driver or occupant of a vehicle approaching from behind.

Third, since the dangerous situation notification unit can be formed by irradiating light on the surface of the rear window, it is possible to prevent a secondary accident by warning of a dangerous situation in advance for a driver or occupant of a vehicle approaching from behind.

DESCRIPTION OF DRAWINGS

FIG. 12 is a cross-sectional view taken along the line XII-XII shown in FIG. 11.

MODE FOR DISCLOSURE

Figure 1:
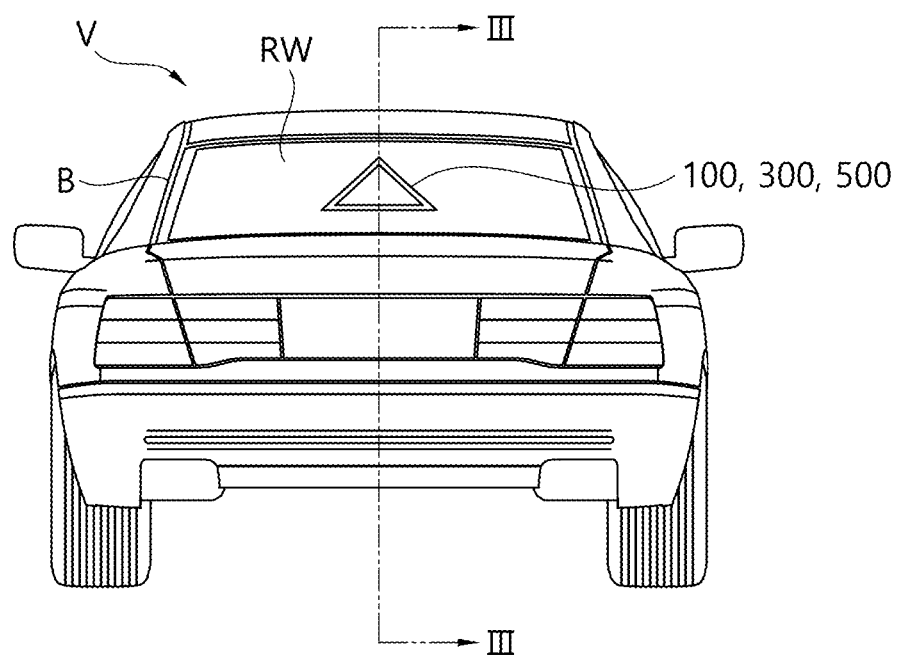
FIG. 1 is a rear front view of a vehicle according to embodiments of the present disclosure.

Hereinafter, a dangerous situation notification assembly for a window shade device of a vehicle and a dangerous situation notification assembly for a rear window of the vehicle according to embodiments of the present disclosure will be described in detail with reference to the accompanying drawings.

Before undertaking the detailed description below, the embodiments of the present disclosure are divided into first and second embodiments for a dangerous situation notification assembly for a window shade device of a vehicle, and a dangerous situation notification assembly for a rear window of the vehicle, and it should be noted that the dangerous situation notification assembly of each embodiment has the same configuration name but is described with different reference numerals.

In addition, in the rear front view of the vehicle shown in FIG. 1, it is also possible to apply both the first and second embodiments of the dangerous situation notification assembly for the window shade device of the vehicle, and the dangerous situation notification assembly for the rear window of the vehicle.

FIG. 1 is a rear front view of a vehicle according to embodiments of the present disclosure.

Figure 3:
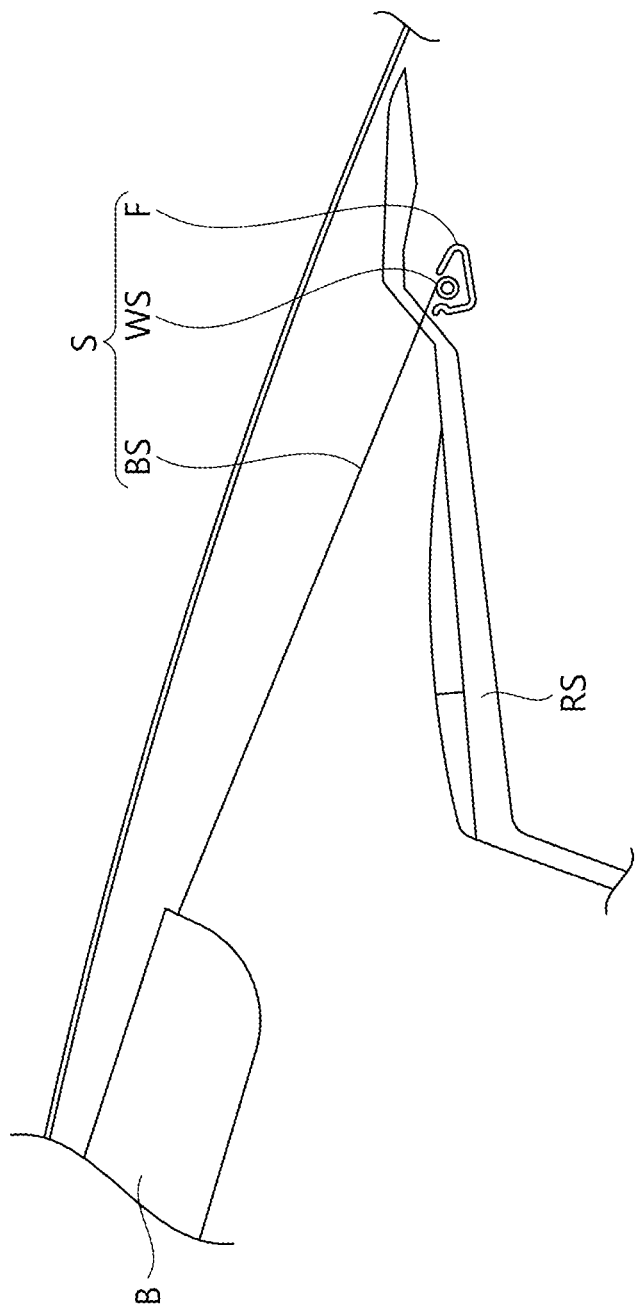
FIG. 3 is a cross-sectional view taken along the line III-III shown in FIG. 1 according to the first embodiment of the present disclosure.

As shown in FIG. 1, a vehicle V includes a vehicle body B, a rear window RW, and a rear shelf RS (see FIGS. 3 and 12). In the rear window RW of the vehicle V shown in FIG. 1, dangerous situation notification units 110 and 310 may be displayed by dangerous situation notification assemblies 100 and 300 for a window shade device of a vehicle according to the first and second embodiments of the present disclosure. In addition, in the rear window RW of the vehicle V shown in FIG. 1, a dangerous situation notification unit 510 may be output by operation of a dangerous situation notification assembly 500 for the rear window of the vehicle.

<Dangerous Situation Notification Assembly for a Window Shade Device of a Vehicle According to the First and Second Embodiments of the Present Disclosure>

A window shade device S (see FIGS. 2 to 9) in which the dangerous situation notification assembly 100 for a window shade device of a vehicle according to the first and second embodiments of the present disclosure is used is arranged in any one of upper or lower sides of the rear window RW. The window shade device S includes a shade BS (see FIGS. 2 to 9), a frame F (see FIGS. 2 to 9), a winding shaft WS (see FIGS. 2 to 9), and a shade bar SB (see FIGS. 2 to 9). The shade BS reciprocates between a shading position where the rear window RW is shaded and a rolling position where the shade is rolled from the shading position. The frame F accommodates the winding shaft WS that winds the shade BS. In addition, the shade bar SB is disposed on one side of the shade BS, specifically, on one side of the shade BS opposite to the winding shaft WS. Here, the window shade device S includes a guide rail, which is not shown, for guiding movement of the shade BS so that the shade BS can reciprocate between the shading position and the rolling position.

Figure 2:
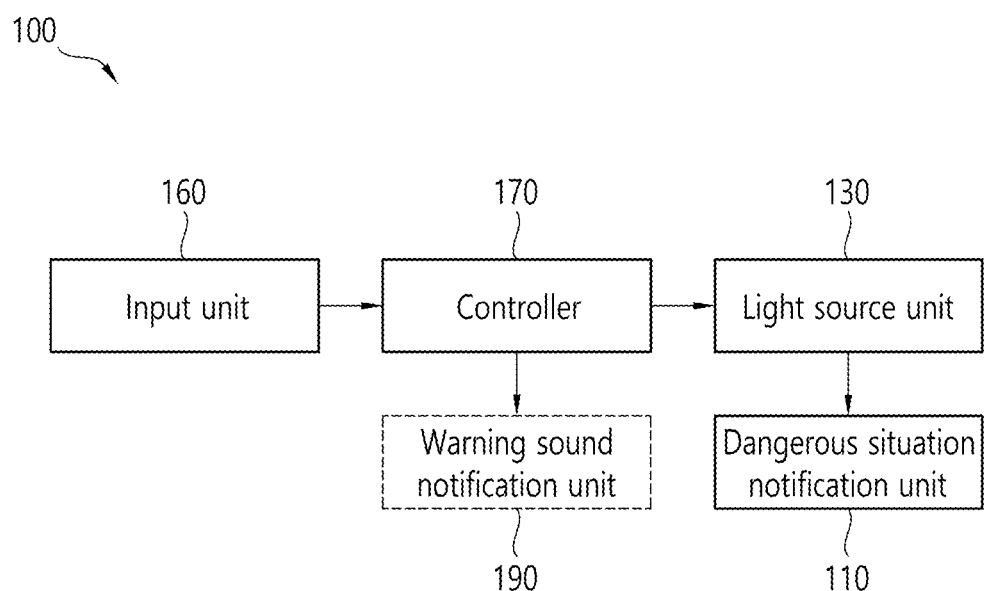
FIG. 2 is a control block diagram of a dangerous situation notification assembly for a window shade device of a vehicle according to a first embodiment of the present disclosure.
Figure 4:
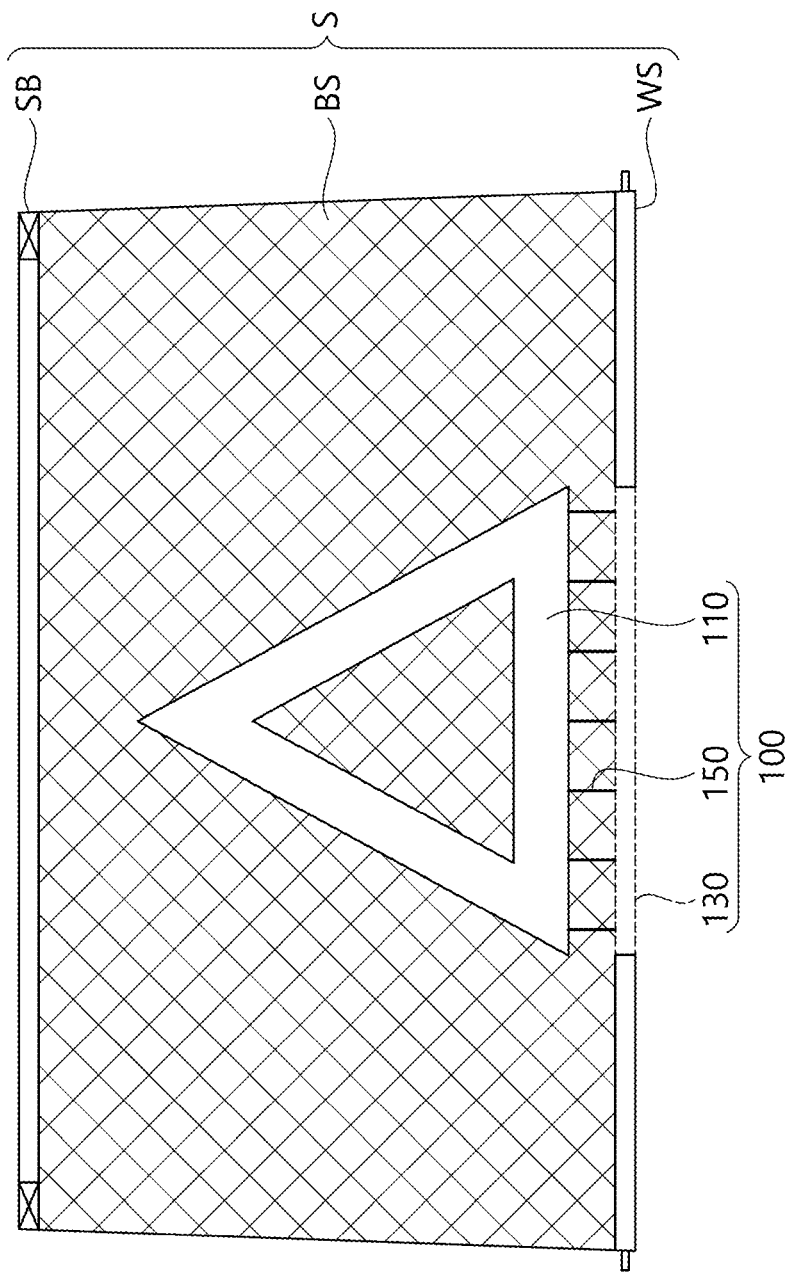
FIG. 4 is a first configuration diagram of a dangerous situation notification assembly for a window shade device of a vehicle according to the first embodiment of the present disclosure.
Figure 5:
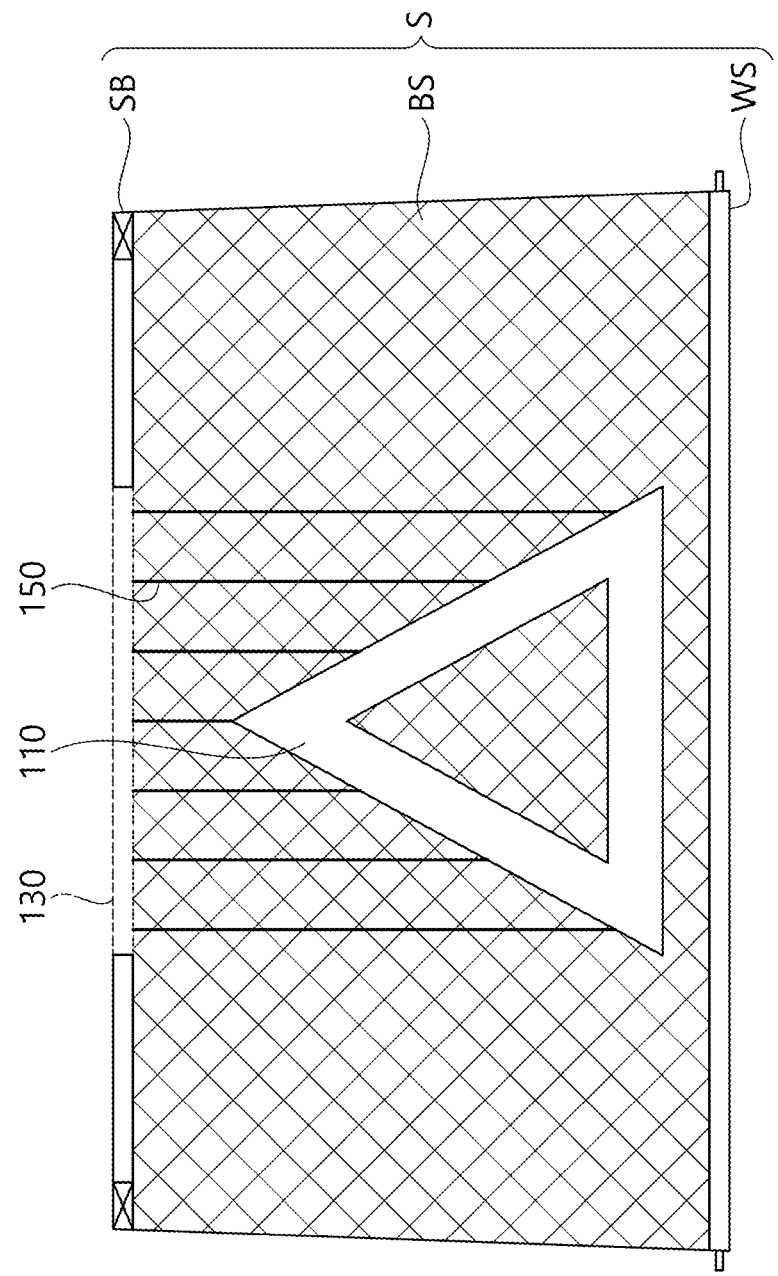
FIG. 5 is a second configuration diagram of a dangerous situation notification assembly for a window shade device of a vehicle according to the first embodiment of the present disclosure.
Figure 6:
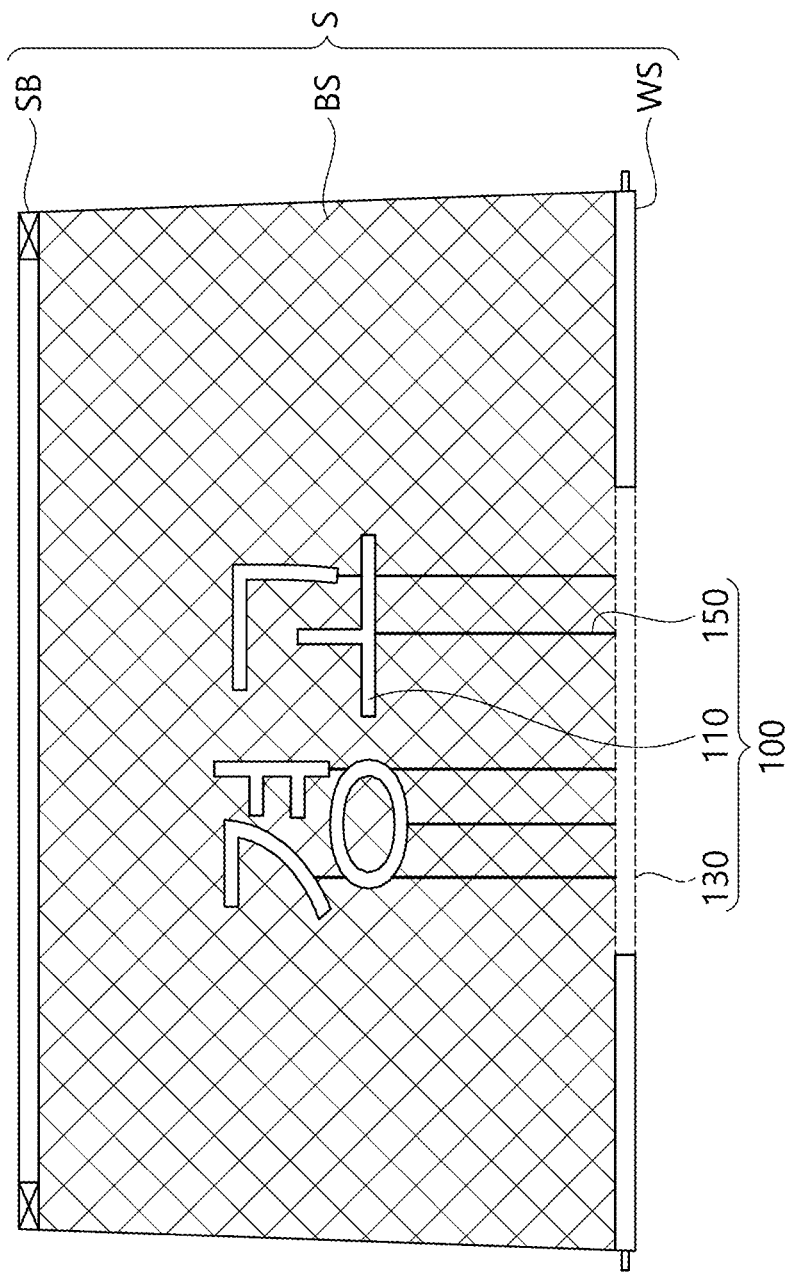
FIG. 6 is a third configuration diagram of a dangerous situation notification assembly for a window shade device of a vehicle according to the first embodiment of the present disclosure.
Figure 7:
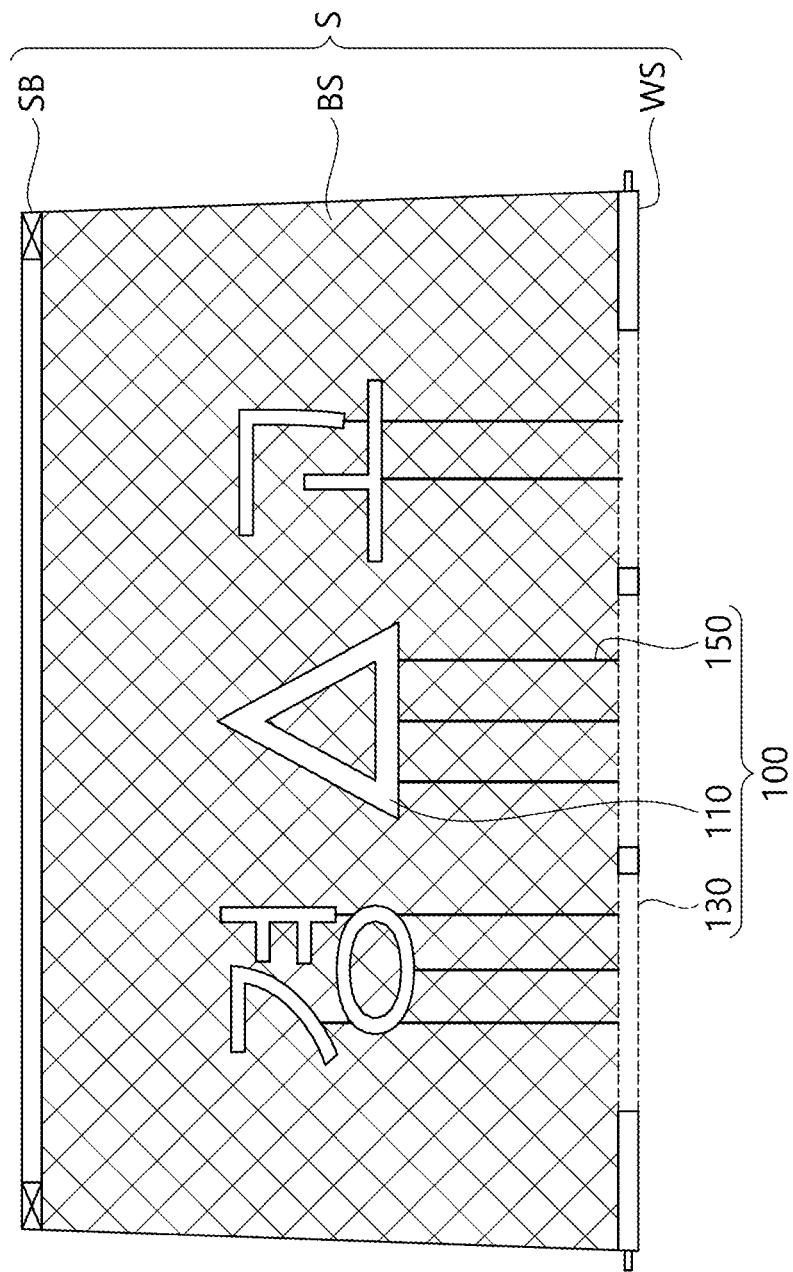
FIG. 7 is a fourth configuration diagram of a dangerous situation notification assembly for a window shade device of a vehicle according to the first embodiment of the present disclosure.

FIG. 2 is a control block diagram of a dangerous situation notification assembly for a window shade device of a vehicle according to a first embodiment of the present disclosure; FIG. 3 is a cross-sectional view taken along the line III-Ill shown in FIG. 1 according to the first embodiment of the present disclosure; FIG. 4 is a first configuration diagram of a dangerous situation notification assembly for a window shade device of a vehicle according to the first embodiment of the present disclosure; FIG. 5 is a second configuration diagram of a dangerous situation notification assembly for a window shade device of a vehicle according to the first embodiment of the present disclosure; FIG. 6 is a third configuration diagram of a dangerous situation notification assembly for a window shade device of a vehicle according to the first embodiment of the present disclosure; and FIG. 7 is a fourth configuration diagram of a dangerous situation notification assembly for a window shade device of a vehicle according to the first embodiment of the present disclosure.

As shown in FIGS. 2 to 7, a dangerous situation notification assembly 100 for a window shade device of a vehicle according to the first embodiment of the present disclosure includes a dangerous situation notification unit 110 and a light source unit 130. In addition, the dangerous situation notification assembly 100 for a window shade device of a vehicle according to the first embodiment of the present disclosure further includes an optical line 150, an input unit 160, a controller 170, and a warning sound notification unit 190.

The dangerous situation notification unit 110 is disposed at the shade BS. The dangerous situation notification unit 110 outputs a dangerous situation by selectively emitting light at the shading position of the shade BS. By emitting light at the shading position of the shade BS, the dangerous situation notification unit 110 may notify of the dangerous situation for a driver of a vehicle approaching from behind. The dangerous situation notification unit 110 is formed of optical fibers in the shade BS. Here, the optical fibers forming the dangerous situation notification unit 110 is formed by any one processing of weaving, coating, impregnation, and lamination on the shade BS.

The dangerous situation notification unit 110 is output as at least one of a figure and a character at the shading position of the shade BS. As shown in FIGS. 4 and 5, the dangerous situation notification unit 110 selectively emits light in a geometric shape such as a triangle at the shade BS. Alternatively, as shown in FIG. 6, the dangerous situation notification unit 110 selectively emits light at the shade BS with the characters "Warning". Of course, the dangerous situation notification unit 110 used as a character may be output according to various words or sentences and various languages of various countries. That is, the dangerous situation notification unit 110 may be formed in the shade BS in English in English-speaking countries, and may be formed in the shade BS with characters of respective languages in German, French, Chinese, and Latin-speaking countries. In addition, as shown in FIG. 7, as for the dangerous situation notification unit 110, the figure shown in FIGS. 4 and 5 and the characters shown in FIG. 6 may be output together.

Meanwhile, the dangerous situation notification unit 110 may flicker at a predetermined interval while at least one of a figure and a character is formed on the shade BS and selectively emits light. The flickering of the dangerous situation notification unit 110 is performed according to a control signal from the controller 170.

The light source unit 130 is disposed adjacent to the shade BS. The light source unit 130 provides light to the dangerous situation notification unit 110 so that the dangerous situation notification unit 110 selectively emits light. As shown in FIG. 4, the light source unit 130 is disposed in an area adjacent to the winding shaft WS or in a frame F accommodating the winding shaft WS. Alternatively, as shown in FIG. 5, the light source unit 130 may be disposed inside the shade bar SB. Various known light sources such as LEDs may be used as the light source unit 130.

Next, the optical line 150 is disposed between the dangerous situation notification unit 110 and the light source unit 130 to optically connect the dangerous situation notification unit 110 and the light source unit 130, so that the light provided from the light source unit 130 can be transmitted to the dangerous situation notification unit 110. As shown in FIGS. 4 and 5, according to the position of the light source unit 130, the optical line 150 is connected to the dangerous situation notification unit 110 from the light source unit 130 disposed lower than the dangerous situation notification unit 110 or is connected to the dangerous situation notification unit 110 from the light source unit 130 disposed higher than the dangerous situation notification unit 110.

The input unit 160 receives an input signal from a driver or a user so that the dangerous situation notification unit 110 selectively emits light. The input unit 160 may be used together with an emergency lights button (not shown) disposed inside a vehicle V and may be disposed as a separate button or an input means. That is, when the emergency lights button is pressed in a state in which the shade BS is at the shading position, the input unit 160 receives an input signal so as to allow the dangerous situation notification unit 110 to emit light along with the emergency lights, or the input unit 160 is disposed separately so as to allow only the dangerous situation notification unit 110 to emit light at the shading position of the shade BS.

Based on the input signal received from the input unit 160, the controller 170 outputs a control signal for controlling the operation of the light source unit 130 so that the dangerous situation notification unit 110 selectively emits light. In addition, based on an input signal applied from the input unit 160, the controller 170 may also output a control signal for controlling the operation of the light source unit 130 so that the dangerous situation notification unit 110 flickers at a predetermined interval.

Next, the warning sound notification unit 190 is disposed in the window shade device S to output a dangerous situation of the vehicle V by a warning sound. The warning sound notification unit 190 provides a dangerous situation as a warning sound, together with the dangerous situation notification unit 110 selectively emitting light from the shade BS. The warning sound notification unit 190 may be provided as a separate configuration or may be integrated with a horn device (not shown) of the vehicle V.

Figure 8:
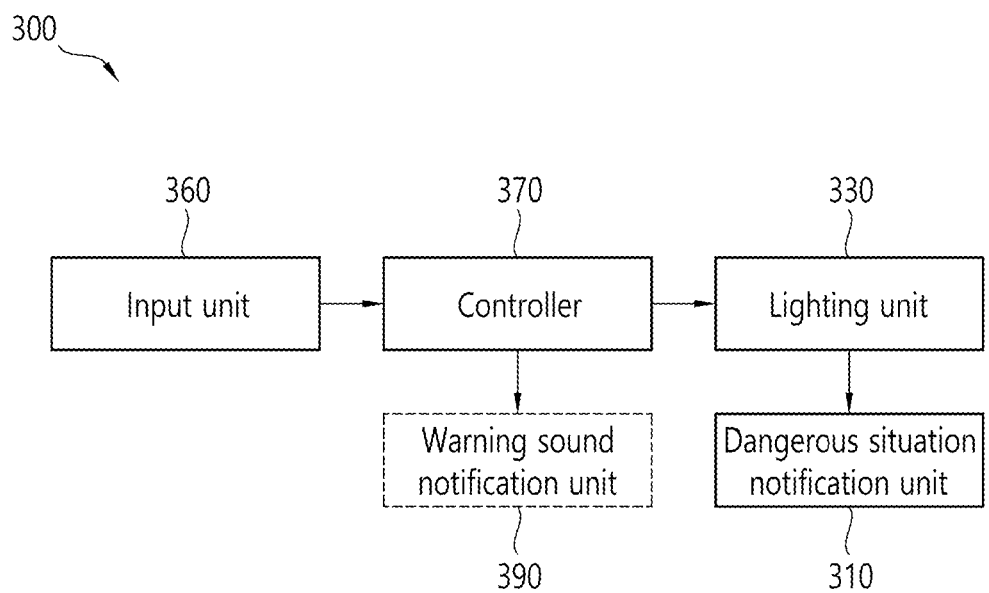
FIG. 8 is a control block diagram of a dangerous situation notification assembly for a window shade device of a vehicle according to a second embodiment of the present disclosure.
Figure 9:
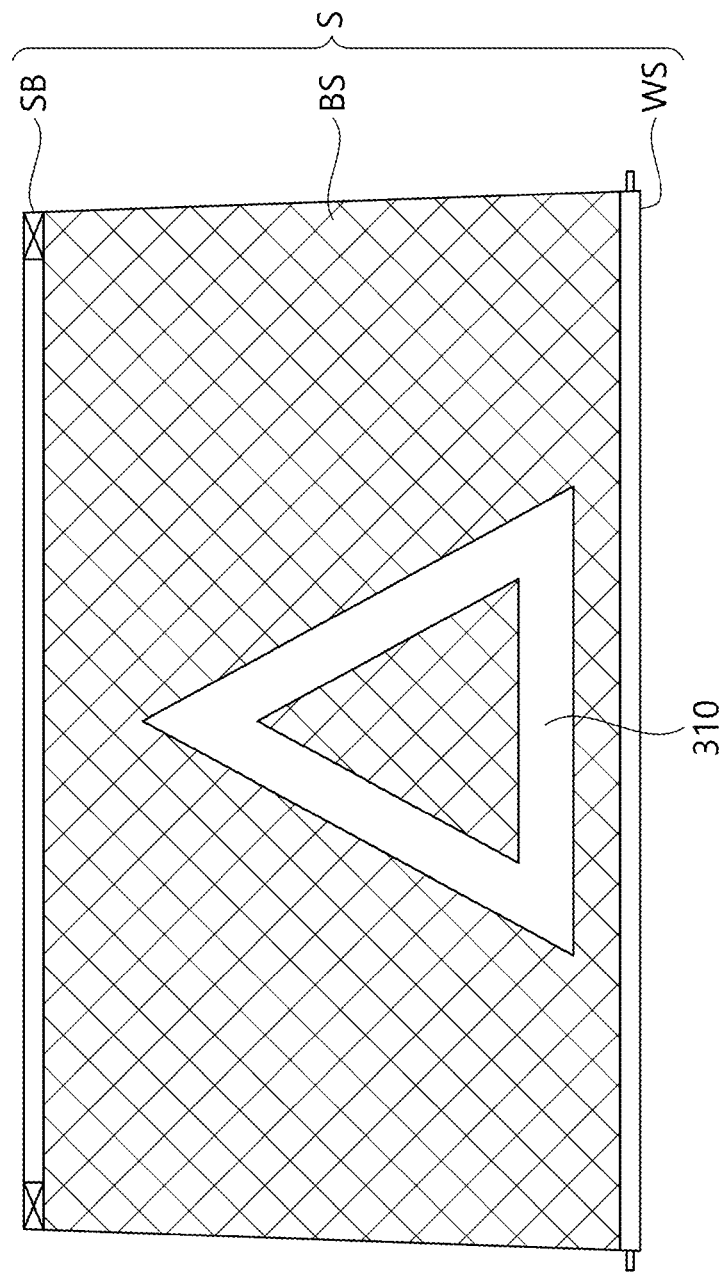
FIG. 9 is a configuration diagram of a dangerous situation notification assembly for a window shade device of a vehicle according to the second embodiment of the present disclosure.

FIG. 8 is a control block diagram of a dangerous situation notification assembly for a window shade device of a vehicle according to a second embodiment of the present disclosure, and FIG. 9 is a configuration diagram of a dangerous situation notification assembly for a window shade device of a vehicle according to the second embodiment of the present disclosure.

As shown in FIGS. 8 and 9, a dangerous situation notification assembly 300 for a window shade device of a vehicle according to the second embodiment of the present disclosure includes a dangerous situation notification unit 310, a lighting unit 330, an input unit 360, a controller 370, and a warning sound notification unit 390.

The dangerous situation notification unit 310 of the dangerous situation notification assembly 300 for the window shade device of a vehicle according to the second embodiment of the present disclosure is formed by processing any one of fluorescence and glaring according to any one of painting, dyeing, and coloring on the shade BS. Unlike the first embodiment of the present disclosure, the dangerous situation notification unit 310 is output by reflected light. Alternatively, the dangerous situation notification unit 310 is output as at least one of a figure and a character, as does the dangerous situation notification unit 110 of the first embodiment of the present disclosure. That is, as shown in FIGS. 4 to 7, the dangerous situation notification unit 310 of the second embodiment of the present disclosure has at least one shape of a figure and a character.

The lighting unit 330 irradiates lighting to the dangerous situation notification unit 310 so that the dangerous situation notification unit 310 formed on the shade BS is output by reflected light. The lighting unit 330 is disposed at a rear shelf RS to irradiate the lighting to the rear window RW, that is, the dangerous situation notification unit 310 formed on the shade BS. In addition, the lighting unit 330 may be disposed at the upper side of a vehicle body B to irradiate the lighting toward the dangerous situation notification unit 310 downward from the upper side. It is preferable that a light source used as the illumination unit 330 is a light source having a wavelength band in which the dangerous situation notification unit 310 can be reflected.

The input unit 360 and the warning sound notification unit 390 of the second embodiment of the present disclosure are the same as the input unit 160 and the warning sound notification unit 190 described in the first embodiment of the present disclosure, and thus, detailed descriptions thereof will be omitted below. Based on an input signal received from the input unit 360, the controller 370 outputs a control signal for controlling the operation of the lighting unit 330 so that the dangerous situation notification unit 310 is output by reflected light from the shade BS. In addition, based on an input signal received from the input unit 360, the controller 370 outputs a control signal for controlling the operation of the lighting unit 330 so that the dangerous situation notification unit 310 is output by reflected light from the shield BS, which is the reflected light which flickers at a predetermined interval.

Accordingly, since the dangerous situation notification unit can be selectively output on the shade by using light at the shading position of the shade, it is possible to prevent a secondary accident by warning of a dangerous situation for a driver or occupant of a vehicle approaching from behind.

In addition, since the dangerous situation notification unit to be selectively output on the shade can flicker at a predetermined interval and a warning sound can be output as well, it is possible to prevent a secondary accident by warning of a dangerous situation for a driver or occupant of a vehicle approaching from behind.

<Dangerous Situation Notification Assembly for a Rear Window of a Vehicle According to an Embodiment of the Present Disclosure>

Figure 10:
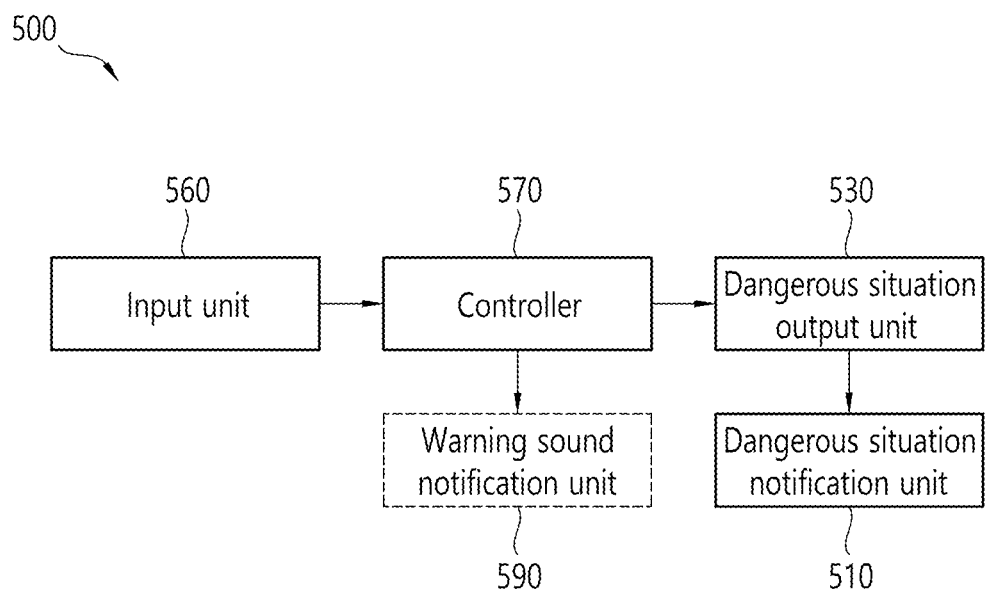
FIG. 10 is a control block diagram of a dangerous situation notification assembly for a rear window of a vehicle according to an embodiment of the present disclosure.
Figure 11:
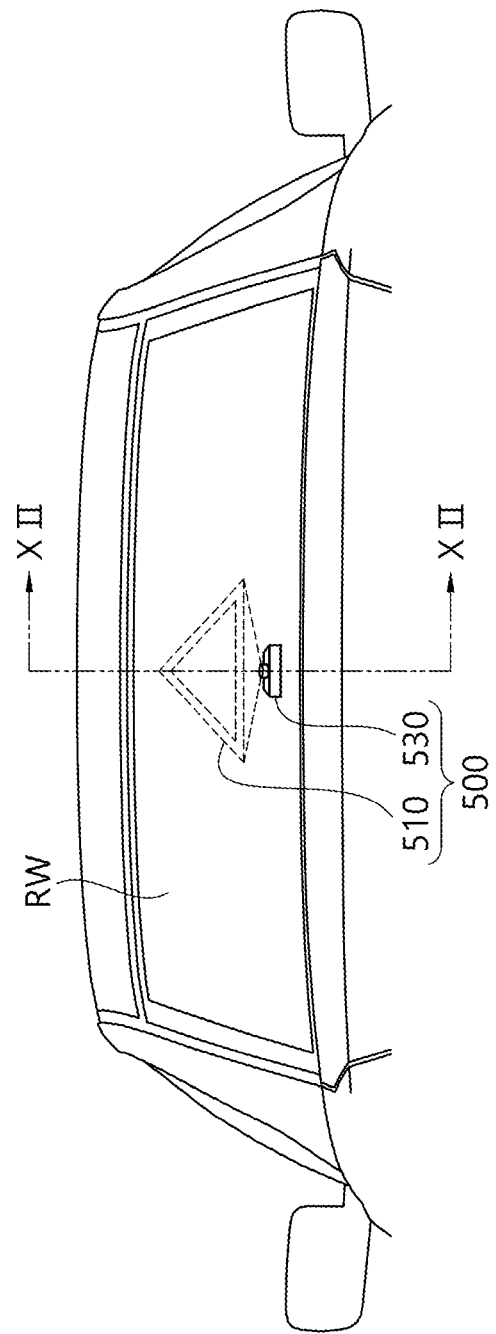
FIG. 11 is a schematic configuration diagram of a dangerous situation notification assembly for a rear window of a vehicle according to an embodiment of the present disclosure.

FIG. 10 is a control block diagram of a dangerous situation notification assembly for a rear window of a vehicle according to an embodiment of the present disclosure; FIG. 11 is a schematic configuration diagram of a dangerous situation notification assembly for a rear window of a vehicle according to an embodiment of the present disclosure; and FIG. 12 is a cross-sectional view taken along the line XII-XII shown in FIG. 11.

As shown in FIGS. 10 to 12, a dangerous situation notification assembly 500 for a rear window of a vehicle according to an embodiment of the present disclosure includes a dangerous situation notification unit 510 and a dangerous situation output unit 530. In addition, the dangerous situation notification assembly 500 for a rear window of a vehicle according to an embodiment of the present disclosure further includes an input unit 560, a controller 570, and a warning sound notification unit 590.

The dangerous situation notification unit 510 is output on a surface of a rear window RW. The dangerous situation notification unit 510 is output on the rear window RW in any one shape of a figure and a character, as do the dangerous situation notification units 110 and 330 of the dangerous situation notification assemblies 100 and 300 of the first and second embodiments of the present disclosure. In addition, the dangerous situation notification unit 510 may be formed to flicker at a predetermined interval.

The dangerous situation output unit 530 is disposed at a vehicle body B corresponding to any one of upper and lower sides of the rear window RW. The dangerous situation output unit 530 irradiates light on the surface of the rear window RW to form a dangerous situation notification unit 510 on the surface of the rear window. In detail, the dangerous situation output unit 530 projects a shape of the dangerous situation notification unit 510 on the surface of the rear window RW. The dangerous situation output unit 530 forms the dangerous situation notification unit 510 on the surface of the rear window RW to flicker at a predetermined interval. Here, the dangerous situation output unit 530 is shown to be disposed at the rear shelf RS in the drawing, but the dangerous situation output unit 530 may be disposed on the upper side inside of the vehicle body B and may also be disposed on a spoiler outside of the vehicle body B to irradiate light, which forms the dangerous situation notification unit 510, on the surface of the rear window RW.

Lastly, since the input unit 560 and the warning sound notification unit 590 are the same as the input units 160 and 360 and the warning sound notification units 190 and 390 of the first and second embodiments of the present disclosure, detailed descriptions thereof will be omitted below. Based on an input signal received from the input unit 560, the controller 570 outputs a control signal for controlling the operation of the dangerous situation output unit 530 so that the dangerous situation notification unit 510 is formed on the surface of the rear window RW. Further, based on an input signal received from the input unit 560, the controller 570 outputs a control signal for controlling the operation of the dangerous situation output unit so that the dangerous situation notification unit 510 is formed on the surface of the rear window RW to flicker at a predetermined interval.

Accordingly, since the dangerous situation notification unit can be formed by irradiating light on the surface of the rear window, a secondary accident may be prevented by warning of a dangerous situation in advance for a driver or occupant of a vehicle approaching from behind.

Although embodiments of the present disclosure were described above with reference to the accompanying drawings, those skilled in the art would understand that the present disclosure may be implemented in various ways without changing the essential features or the spirit of the prevent invention. Therefore, the embodiment descried above should not be construed as being limitative, but should be construed as being only illustrative from all aspects. The scope of the present disclosure is defined by the appended claims rather than the detailed description, and it should be construed that all changes or modifications derived from the meaning and scope of the claims and their equivalents are included in the scope of the present disclosure.

The invention claimed is:

1. A dangerous situation notification assembly for a window shade device for a vehicle, wherein the window shade device has a shade provided on any one of upper and lower sides of a rear window and reciprocating between a shading position where the rear window is shaded and a rolling position where the shade is rolled from the shading position, and wherein the assembly comprises:
   a dangerous situation notification unit disposed at the shade and configured to selectively emit light at the shading position of the shade to output a dangerous situation; and
   a light source unit disposed adjacent to the shade and configured to provide light to the dangerous situation notification unit so that the dangerous situation notification unit selectively emits light,
   wherein the dangerous situation notification unit is formed by processing any one of fluorescence and glaring according to any one of painting, dyeing, and coloring on the shade,
   wherein the dangerous situation notification unit is output by reflected light on the shade by light irradiated by the light source unit,
   wherein the dangerous situation notification unit is output as at least one of a figure and a character at the shading position of the shade, and
   wherein the dangerous situation notification unit is output to flicker at a predetermined interval of light irradiated from the light source unit.

2. The assembly of claim 1,
   wherein the dangerous situation notification assembly for the window shade device of the vehicle further comprises:
   a warning sound notification unit disposed at the window shade device of the vehicle and configured to output a dangerous situation of the vehicle by a warning sound.

3. A dangerous situation notification assembly for a rear window of a vehicle, wherein the assembly is disposed at a vehicle body surrounding the rear window and the assembly comprises:
   a dangerous situation notification unit configured to be output on a surface of the rear window; and
   a dangerous situation output unit disposed at the vehicle body corresponding to any one of upper and lower sides of the rear window, and configured to form the dangerous situation notification unit by irradiating light on the rear window,
   wherein the dangerous situation notification unit is output as at least one of a figure and a character on the surface of the rear window, and
   wherein the dangerous situation output unit is configured to output the dangerous situation notification unit on the surface of the rear window at a predetermined interval so that dangerous situation notification unit is output to flicker on the surface of the rear window.

4. The assembly of claim 3,
   wherein the dangerous situation output unit is configured to project a shape of the dangerous situation notification unit on the surface of the rear window.

5. The assembly of claim 3,
   wherein the dangerous situation notification assembly for the rear window of the vehicle further comprises:
   a warning sound notification unit disposed at the vehicle body corresponding to at least one of the upper and lower sides of the rear window and configured to output a dangerous situation of the vehicle by a warning sound.

6. A dangerous situation notification assembly for a window shade device for a vehicle, wherein the window shade device has a shade provided on any one of upper and lower sides of a rear window and reciprocating between a shading position where the rear window is shaded and a rolling position where the shade is rolled from the shading position, and wherein the assembly comprises:
   a dangerous situation notification unit disposed at the shade and configured to selectively emit light at the shading position of the shade to output a dangerous situation; and
   a light source unit disposed adjacent to the shade and configured to provide light to the dangerous situation notification unit so that the dangerous situation notification unit selectively emits light,
   wherein the dangerous situation notification unit is formed of optical fibers in the shade, and
   wherein the dangerous situation notification unit is output to flicker at a predetermined interval of light irradiated from the light source unit.

7. The assembly of claim 6,
   wherein the dangerous situation notification assembly for the window shade device of the vehicle further comprises:
   an optical line disposed between the dangerous situation notification unit and the light source unit and configured to optically connect the dangerous situation notification unit and the light source unit so that light provided from the light source unit is transmitted to the dangerous situation notification unit.

8. The assembly of claim 6,
   wherein the optical fibers forming the dangerous situation notification unit are formed by any one of weaving, coating, impregnation, and lamination on the shade.

9. The assembly of claim 7,
wherein the dangerous situation notification unit is output as at least one of a figure and a character at the shading position of the shade.

* * * * *